United States Patent [19]

Hovagimyan et al.

[11] 4,028,499
[45] June 7, 1977

[54] UNIVERSAL/ASSIGNED NIGHT ANSWERING SYSTEM FOR EPABX

[75] Inventors: Norman Hovagimyan, Cherry Hill; Anthony Domenic Iadicola, Cinnaminson; William Paul Ianuzzi, Cherry Hill, all of N.J.

[73] Assignee: RCA Corporation, New York, N.Y.

[22] Filed: Nov. 28, 1975

[21] Appl. No.: 636,094

[52] U.S. Cl. .................................... 179/18 BD
[51] Int. Cl.² ................................... H04M 3/58
[58] Field of Search ............. 179/18 AD, 18 BD

[56] References Cited
UNITED STATES PATENTS

| | | | |
|---|---|---|---|
| 3,449,527 | 6/1969 | Strobelt et al. | 179/18 BD |
| 3,459,897 | 8/1969 | Terasaka | 179/18 AD |
| 3,636,267 | 1/1972 | Fritz et al. | 179/18 BD |
| 3,836,723 | 9/1974 | Ohara et al. | 179/18 AD |
| 3,867,581 | 2/1975 | Pommerening | 179/18 BD |

Primary Examiner—William C. Cooper
Attorney, Agent, or Firm—Carl M. Wright; Edward J. Norton

[57] ABSTRACT

Universal/Assigned Night Answering system incorporated in an EPABX system permits any telephone station to answer a universal incoming call or an associated assigned incoming call from incoming trunk line while retaining the ability to initiate calls to other telephone stations within the EPABX system or to outgoing trunk lines. A UNA/ANA module is provided using a standard half-register for UNA operation and circuitry for ANA, the module also being coupled to the common control line and having its own vertical line in the switching matrix.

4 Claims, 9 Drawing Figures

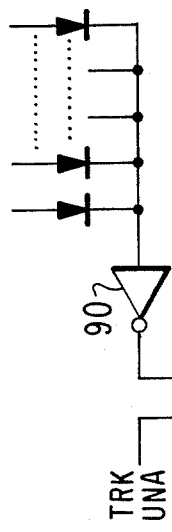
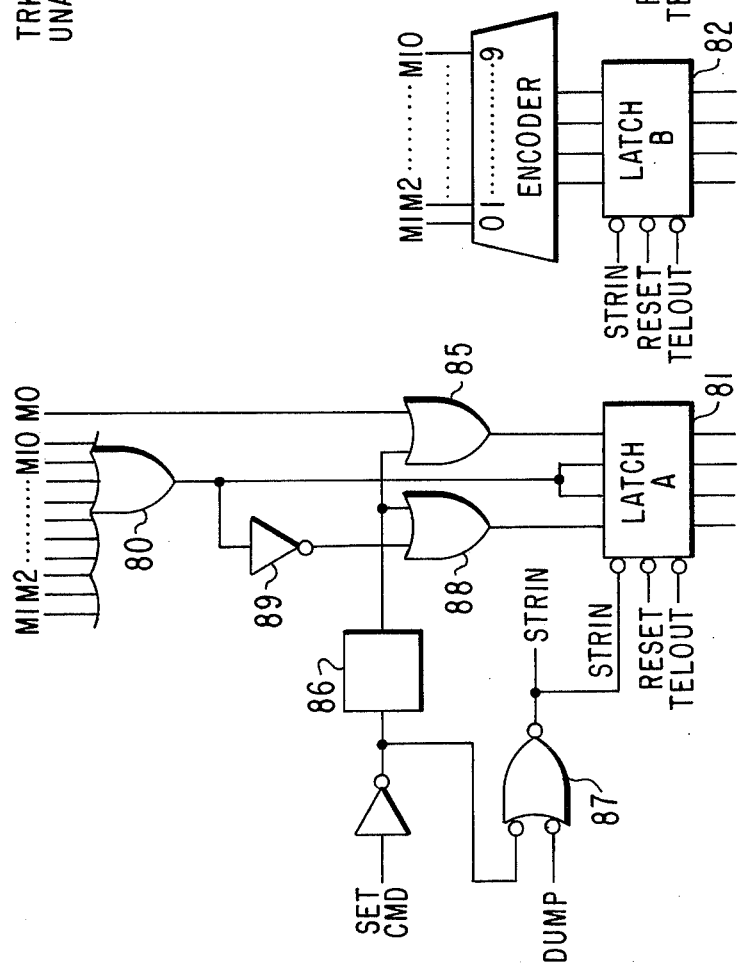
Fig. 9.
Fig. 8.

UNIVERSAL/ASSIGNED NIGHT ANSWERING SYSTEM FOR EPABX

BACKGROUND OF THE INVENTION

This invention relates to improvements in electronic private automatic branch exchanges (EPABX's) for controlling telephone calls.

PBX's, which include EPABX's, may be completely automatic, but many are manned by an attendant, during normal work hours, at least. In those places not requiring a PBX attendant during all hours, it is still desirable that persons in the area served by the PBX during the hours that the PBX is unattended be able to complete outgoing and incoming calls. Outgoing calls are usually made by dialing one or two predetermined digits from a telephone station to cause the PBX control circuits and registers to connect the calling station to an outgoing trunk line to the telephone company's central office.

Incoming calls are, on the other hand, more difficult to handle. Usually, provisions are made at the PBX control console to connect each incoming trunk to a specific telephone station. When an incoming call is received, telephone station associated with that trunk rings and the incoming call must be taken at that station. This arrangement is often unsatisfactory because the station connected to the trunk may be remote from the location in which persons might be located. Call pick-up services have a similar disadvantage.

Another disadvantage of the prior art circuits for receiving incoming calls through an unattended PBX with incoming trunks patched to specific stations is that the stations so patched can only make outgoing calls or receive incoming ones. They cannot be used to call other stations within the same PBX system.

The described disadvantages can be overcome by using a Universal Night Answering (UNA) or Assigned Night Answering (ANA) circuit as described herein.

SUMMARY OF THE INVENTION

A telephone switching system which is capable of receiving incoming telephone calls and having a plurality of telephone stations is arranged to connect any incoming telephone call to any one of the plurality of telephone stations. Provision is also made for permitting any one of the telephone stations to initiate switching of an incoming telephone call to that particular one telephone station while retaining the ability to initiate outside calls or calls to any other telephone station.

BRIEF DESCRIPTION OF THE DRAWING

FIG. 8 is a logic diagram of an embodiment of a UNA binary coded telephone number generator.

FIG. 9 is a logic diagram of a UNA-ANA interlock.

DETAILED DESCRIPTION OF THE PREFERRED EMBODIMENT

Figure 1:
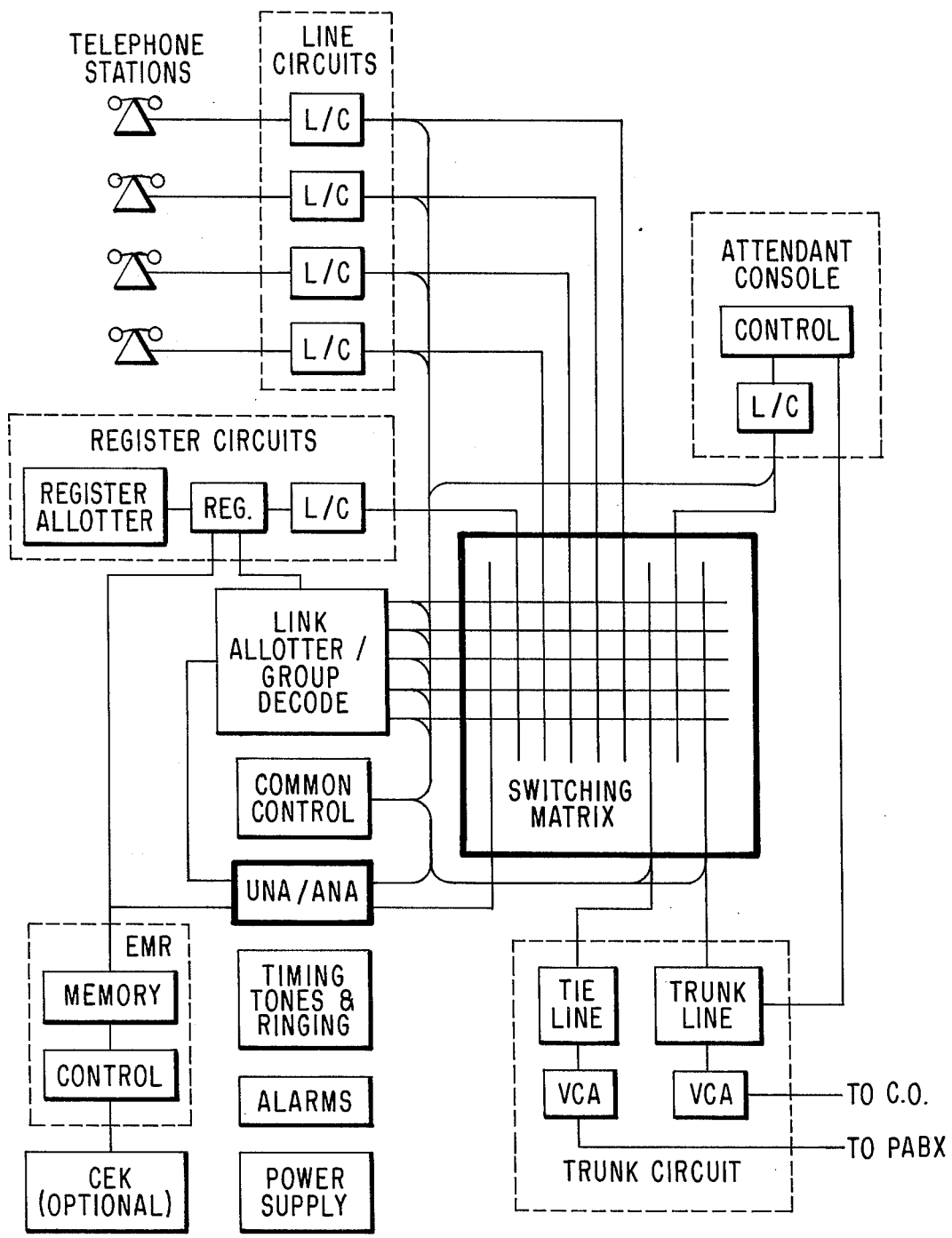
FIG. 1 is a block diagram of an EPABX system in which the invention would be included.

The embodiment of the invention described herein is in terms of a crossbar PABX system, but it will be clear to a person of ordinary skill in the art how the invention can be used with a step-by-step type PABX system.

A crossbar PBX system is designed to couple station lines, central office trunks, tie trunks, and telephone stations to one another under the control of a common group of circuits. The common (group) control, sometimes called a marker circuit, is interconnected to all the other circuits in the system by a common information transfer bus. The crossbar switches are comprised of lines from stations, trunks, line circuits, and the like and are called crossbar switch verticals. The verticals are capable of being selectively coupled to horizontal lines which are called links.

When a telephone station originates a call by going off-hook, a line relay is activated to identify the calling line to the marker. In the case of a dial station, the marker selects an idle pulse register and establishes a connection from the calling station to the selected register through an idle link in the crossbar switch. The register then sends a dial tone to the calling station. The register stores the dial pulses from the calling station and when the dialed information has been completely stored, the register identifies to the common control the type of call being placed, such as station-to-station, tie line trunk, central office trunk, and so on, the number called, and whether the calling station is permitted the type of call being made. The common control then completes the call through an idle junctor switch and links the calling and called stations. When the called station answers, the junctor disconnects the ringing circuit and completes the transmission path. The common control circuit thereupon is disconnected and is ready to handle the next call. This is usually called a time sharing system because the common circuits can handle only one call at a time. Once the common control circuit couples the calling station to a register, it is free to check for other calls if there are idle registers.

Such PBX systems are well known in the art and are described in detail by various telephone applications notes. PBX crossbar systems can be mechanical or electronic. Although the invention can be adapted to either type of crossbar system, the explanation herein relates to an electronic PABX system.

To couple the electronic equipment to outside telephone trunk lines, the telephone company supplies, for example, a voice control arrangement (VCA) for coupling to the line. The input lines from the outside telephone line are the tip and ring lines. At the user end of the VCA are two voice lines, two lines providing a switch contact in synchronization with the ringing circuit, and two input lines for providing the dial input signals for dialing an outgoing call.

The UNA/ANA circuitry described herein can be used most advantageously in EPABX's utilizing control devices which are predominantly constructed from binary logic elements. The duality between electronic (logic) EPABX systems and electro-mechanical PBX systems is well known in the art. The operation of telephone stations, i.e., handsets and the like, and of register circuits, link allotters, line circuits, switching matrices, trunk lines, tie lines, and other common telephone equipment is well known and need not be described in detail for an understanding of the invention.

In FIG. 1, a UNA/ANA control block is shown in conjunction with a typical EPABX system. The EPABX system block diagram is simplified for clarity of presentation.

The UNA/ANA function is activated by a switch on the attendant's console. When activated, the UNA/ANA module will recognize an incoming call on a trunk and, in the ANA mode, cause a call to be placed to the night answering station assigned to the trunk or, in the UNA mode activate an annunciator.

If the called station in the ANA mode is idle, the normal station ringer will ring and, when the handset is lifted, the ring at the central office side will be tripped and supervision returned to the central office. If the night answering station fails to answer after seven rings, the connection will be made again and ringing will resume at the station end until the trunk abandons the call from the central office.

If the night answering station is busy at the time an incoming call arrives, the ANA circuit will cause a warning tone to be placed on the line, such as a 500 ms. burst of tone and then the trunk will camp on the call. When the called station hangs up, the telephone will ring again. When the station goes off hook to answer the incoming call, the trunk supervision will be returned and the station will talk to the trunk. This version of ANA requires no special station wiring and allows the night answering station to function normally at all times.

In the UNA mode, no station ringer is activated. Instead, an annunciator is used to indicate an incoming call. Any station can then answer the incoming call by dialing a predetermined code. The UNA code is detected by the register circuit which picked up the telephone station line circuit when the station went off-hook. All incoming trunk circuits are then scanned. When a ringing signal is found, the station is connected to the trunk and the central office ring is tripped.

Figure 2:
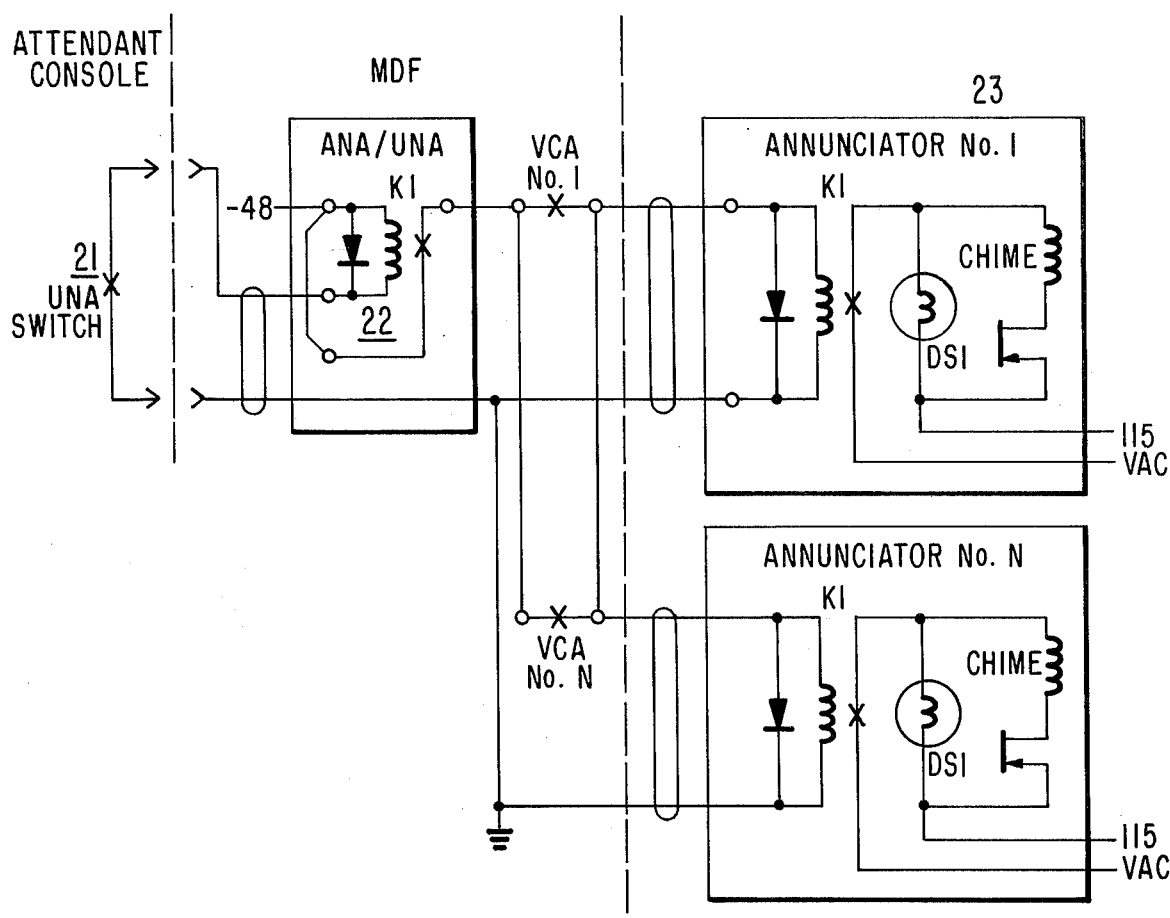
FIG. 2 is a schematic of a UNA annunciator circuit.

FIG. 2 shows an embodiment of an annunciator circuit for use in the UNA mode. When a UNA switch 21 on the attendant's console is activated, a relay 22 is activated, supplying a potential via a set of normally open contacts to a set of normally open contacts ring contacts on a voice connecting arrangement (VCA). The VCA, supplied by the telephone company and fully described in their application notes, couples the incoming trunk lines to the EPABX system as shown in FIG. 1. When the VCA ring contacts are closed because of incoming call, a relay in a corresponding annunciator 23 is activated.

Figure 3:
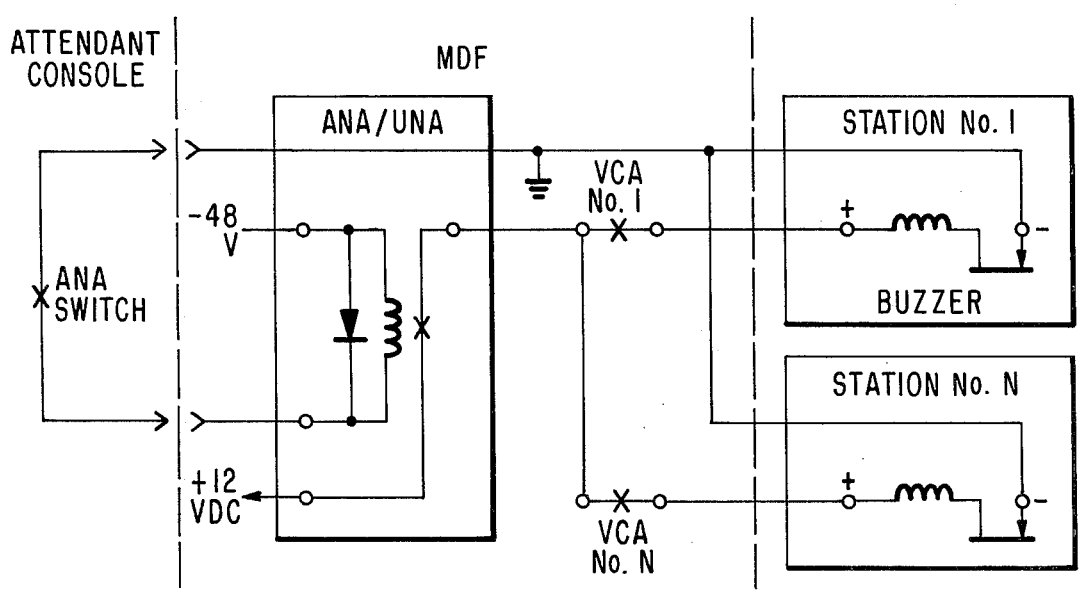
FIG. 3 is a schematic of one embodiment of an ANA station annunciator circuit.

FIG. 3 shows a similar arrangement for alternate use in the ANA mode. Instead of activating an annunciator, a buzzer at a corresponding telephone station can be activated instead of the ringer if desired.

Figure 4:
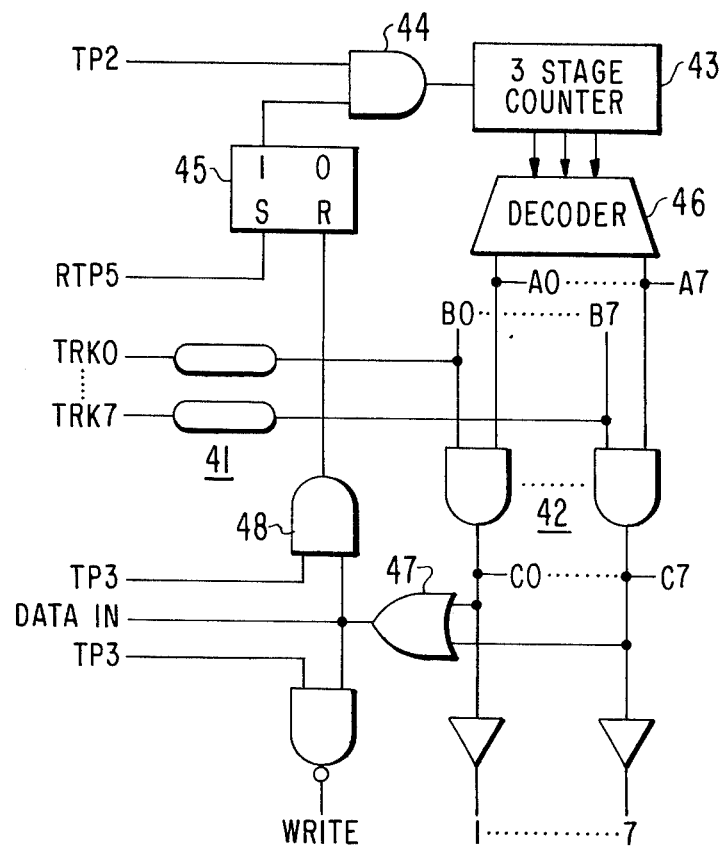
FIG. 4 is a logic diagram of an embodiment of a trunk scanner circuit in a UNA/ANA module.

The UNA/ANA module functions as a trunk scanner, a telephone number generator, equipment location generator, service memory, partial register and control circuits. The inputs to the trunk scanner shown in FIG. 4 are the contacts of the VCA which are closed for an incoming call, i.e., ringing. In FIG. 4, trunk lines are coupled through 10-second integrators 41, each to one input of one of a set of AND gates 42. For purposes of illustration, only eight trunks are considered. A three-stage counter 43 is driven by the output signal from an AND gate 44 which is activated by a timing signal TP2 when an enabling flip-flop 45 is set. The output signals from the three-stage counter 43 constitute a three bit binary number coupled to a decoder 46 which activates one of eight output lines in sequence according to the value in the three-stage counter 43. Each separate output signal from the decoder 46 is coupled to a different one of the AND gates 42. Therefore, when a line trunk is found to be in the ring condition, one of the output signals from the AND gate will produce an output signal which activates an OR gate 47. The output signal from the OR gate 47 and the timing pulse TP3 activate an AND gate 48 which resets the flip-flop 45, halting the operation of the trunk scanner by inhibiting the AND gate 44 by the set output signal of logical zero from the flip-flop 45. The output signal from the activated one of the AND gates 42 is encoded by an encoder (not shown) such as a diode matrix to indicate the telephone number assigned to the ringing trunk. The line circuit associated with the telephone number decodes its number from the matrix and answers back as idle. At this time, a second matrix generates the equipment location of the trunk which is ringing.

Figure 5:
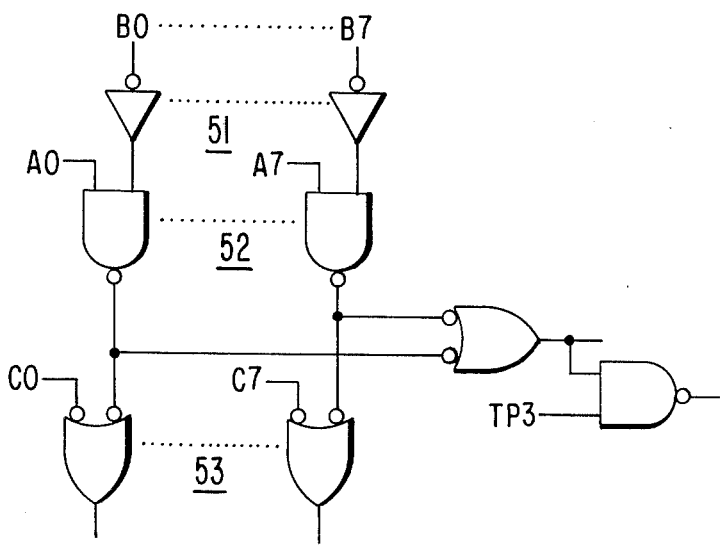
FIG. 5 is a logic diagram of an embodiment of an equipment locator circuit in a UNA/ANA module.

FIG. 5 shows an equipment location generator comprising a group of AND gates 52 which are also coupled to the output signals from the decoder 46 through inverters 51. The output signals from the AND gates 52 are coupled as one input to each of a group of OR gates 53 which have as a second input, the output signals from one of the AND gates 42 in FIG. 4. The output signals from the OR gates 53 are coupled to an equipment location diode matrix.

Figure 6:
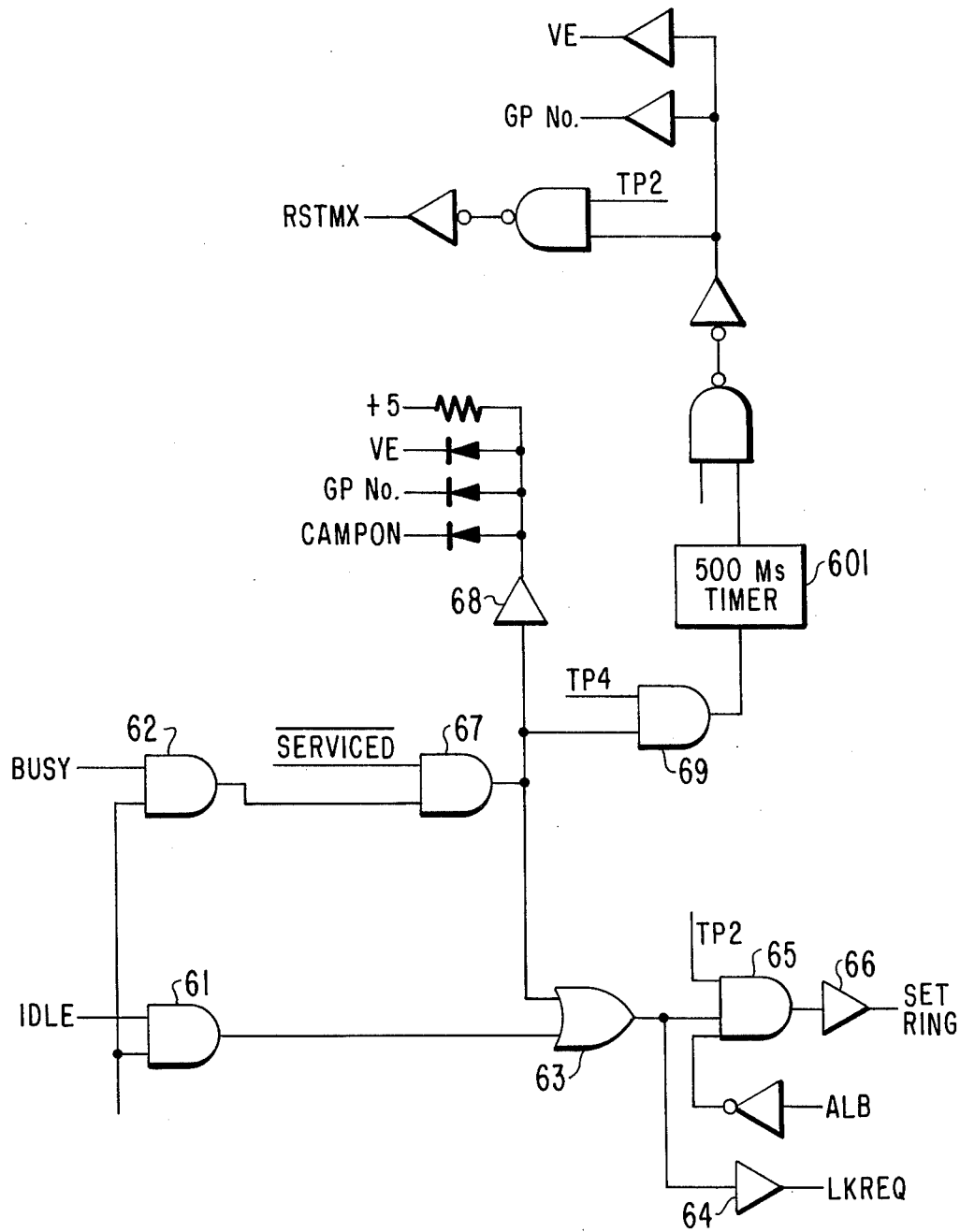
FIG. 6 is a logic diagram of an embodiment of a control circuit of a UNA/ANA module.

FIG. 6 shows the control logic for the UNA/ANA module. An appropriate enabling signal is applied to two AND gates 61 and 62. The line circuit answering back as idle by decoding its telephone number as previously described activates the AND gate 61 to produce an output signal from an OR gate 63 which generates a link request signal through a suitable driver 64. At a proper time (TP2) via an AND gate 65, a set ring signal is generated via a suitable driver 66.

If the line circuit decoding its telephone number is busy, an AND gate 62 is activated and its output signal activates an AND gate 67 if the call is shown as not serviced. The output from the AND gate 67 generates, inter alia, a camp on signal via a suitable driver 68 and also produces an enabling signal to the OR gate 63 to generate a link request signal. The output of the AND gate 67 also primes an AND gate 69 which, at time pulse four, activates a 500 MHz timer 601 to produce the signals for inserting a tone on the station when busy.

Figure 7:
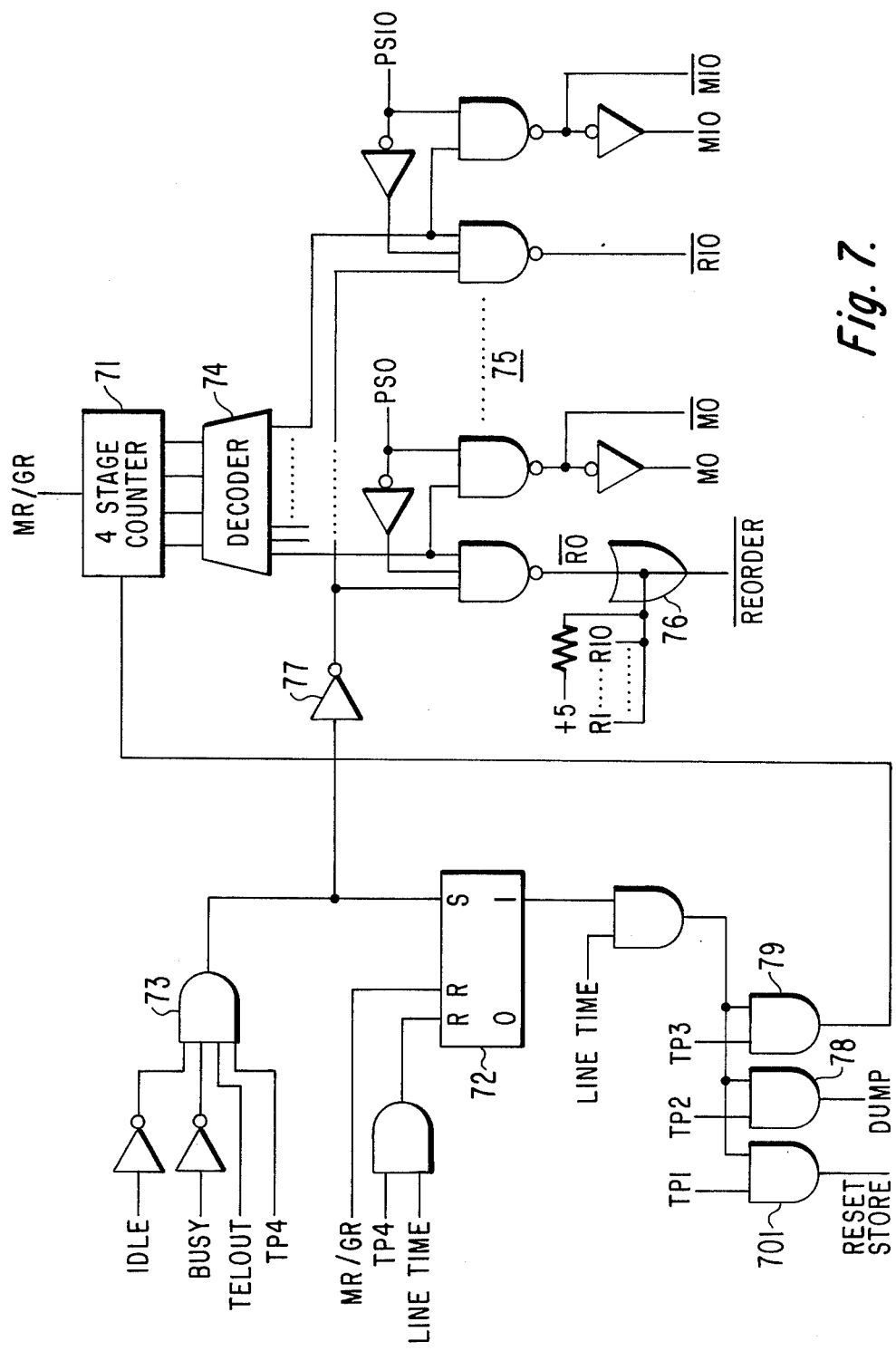
FIG. 7 is a logic diagram of an embodiment of a UNA trunk number allocator.

FIG. 7 illustrates the logic to be added to the system to perform the UNA function as described above. The trunk numbers are assigned a number within the PABX system different from the actual number the line may have from the central station. For example, outside lines might be accessed in PBAX system by dialing a single digit. Sometimes, where there are a large number of nearby central offices, each central office is accessed by dialing a different digit. Each central office may be coupled to the PBAX by more than one trunk line so that when the central or trunk number digit is dialed at a telephone station, the register will look at each successive trunk line to the dialed central station until an idle trunk is found. The UNA system described herein also searches successive trunks which may be designated as two digit numbers beginning with eight or nine.

In FIG. 7, a four stage counter 71 is advanced by each time pulse three during a line time signal while a flip-flop 72 is set. The flip-flop 72 is set by the output signal from an AND gate 73 which is enabled when neither the idle nor busy signal are received during a telephone number out signal and is primed by time pulse four. The absence of both an idle and busy signal indicates that the trunk addressed does not exist. This causes the counter 71 to step to the next trunk group designation number. The output signal from the four-stage counter 71 is decoded by a decoder 74 which activates one of 10 output signals depending on the value in the four-stage counter 71.

The output signal from each decoded output terminal primes two AND gates. One AND gate from each of the 10 pairs of AND gates 75 primes an OR gate 76 which produces a reorder output signal. The other AND gate of each pair produces an output signal indicating the decimal equivalent of the contents of the four stage counter 71 and its complement.

Each of the first pair of AND gates 75 has three input terminals. One input terminal is coupled to the corresponding output signal from the decoder 74. Another input signal is provided by the complement signal from the AND gate 73 via an inverter 77 to inhibit the AND gate output signal when there is no trunk being addressed. The third input signal to the first of each pair of AND gates 75 is the complementary signal from a program switch. The program switch signal is also an input signal to the second of each pair of the corresponding pair of AND gates 75.

The program switch can be simply a 10-contact single-pole rotary type switch which, when placed in a position zero through 10, produces a low or binary zero signal at the corresponding output terminal. The purpose of the program switch is to indicate where the stepping logic described is to stop. The program switch inhibit prevents the system from cycling endlessly when the number has been already answered by another station, when a UNA number is accidentally dialed when there is no incoming call, or when the calling party terminates the call before the UNA is coupled to the calling trunk. Therefore, when the OR gate 76 is activated, the reorder signal through a half-register portion of the UNA will reset the switching matrix. The counter is advanced by the output signal 79 from an AND gate as described above. The output signal from an AND gate 78 at time pulse two during the line time while the flip-flop 72 is set produces a dump signal which sets the new trunk number in the appropriate latches as described below. An AND gate 701 produces a reset strobe signal at time pulse one under the same conditions.

The output signals from the logic described in FIG. 7 are used as input signals to the logic shown in FIG. 8. The digits of the telephone number of the trunk being addressed are stored in latch circuits 81–84. In the system being described, it is assumed that no trunk or tie line circuit is accessed by a number ending in zero or 1. Therefore, the least significant telephone number in digit latch 84 is automatically set to a value of decimal 2 when the latches are strobed. The latch 83 merely stores a zero which is the tens digit of the binary coded telephone number. Latch 81, which holds the most significant digit of the binary coded telephone number being addressed in the UNA mode, is coupled to receive via an OR gate 80, the output signals from the decoding AND gates 75 described in FIG. 7. The MO output signal is coupled to an OR gate 85. A ring (or set command) triggers a pulse stretcher, such as a one shot multivibrator 86, and, via an OR gate 87, produces a strobe-in (STRIN) signal to the latches 81–84. A STRIN signal is also produced from the OR gate 87 in response to a dump signal from the AND gate 78 (FIG. 7). The output signal from the one-shot 86 enables the OR gate 85 and an OR gate 88 so that the value of nine is initially stored in the most significant digit position. The second significant digit latch 82 is set by the encoded value from the gates 75 (FIG. 7). Also, a nine is initially set into the most significant digit latch 81 by the MO signal via the OR gate 85 and the complement of the output signal from the OR gate 80 via an inverter 89 and the OR gate 88. Any other value via the OR gate 80 sets the most significant digit latch to the value of six.

The latches 81–84 are reset by the output signal from the AND gate 701 (FIG. 7). The TELOUT signal to the latches gate the latch contents, i.e., the binary coded telephone number.

Whereas the logic shown in FIG. 7 and the latches 81 and 82 of FIG. 8 address the group number of the trunk circuit being scanned, the other digits of the trunk numbers are stepped by the UNA mode using a Hunt Not Busy (HNB) signal with a conventional register circuit which is included in the UNA module. The HNB or rotary mode of operation of a register is well known in the art and needs no additional explanation. The HNB signal causes a register automatically to increment the number received to access another line of the same class.

Referring back to FIG. 7, the AND gate 73 will be activated if a non-existent trunk is addressed, causing the logic of FIG. 7 to advance to the next group. When the groups have been exhausted, the program switch signal, which is manually set, causes a reorder signal from the OR gate 76 to reset the matrix and the line circuit of the telephone station is dropped.

FIG. 9 illustrates a circuit for preventing the UNA circuit from picking up an AND trunk in those instances when an ANA is identifying itself by going off hook at the instant that the UNA is scanning the particular line.

A vertical enable signal from those trunks which are assigned ANA numbers are coupled to an inverter 90 via a plurality of diodes. These diodes can be arranged on a plug board whereby those numbers having a night number assigned thereto can be connected to the inverter 90 via the line circuit. The trunk UNA signal, such as from the VCA connect switches shown in FIG. 2, enables the UNA signal from an AND gate 91 when a line circuit of an ANA telephone station is not identified via a vertical enable signal. The UNA signal at the output of the AND gate 91 activates the half register in the UNA module by activating the HNB circuitry.

A system has been described which allows an EPABX system to employ universal night answering and assigned night answering, without denying the user the benefit of every telephone for the purpose of making outgoing calls or station-to-station calls within the EPABX system, by the use of a special module including a half register.

Various modifications to the systems and circuits described and illustrated to explain the concepts and modes of practicing the invention might be made by those of ordinary skill in the art within the principles or scope of the invention as expressed in the appended claims.

What is claimed is:

1. In a telephone switching system having a plurality of incoming lines to be selectively coupled to selected ones of a plurality of telephone stations, said telephone stations having means for selectively producing dial signals, annunciator means responsive to a ringing signal on one of said plurality of incoming lines for indicating an active incoming line, register means responsive to an off-hook signal from a telephone station for producing answering mode signals, and means responsive to said register means for permitting interstation calls to be initiated between telephone stations not coupled to an incoming line, the improvement comprising:

coupling means responsive to said answering mode signals for directly coupling said off-hook telephone station to said active incoming line, said coupling means comprising counter means for producing in sequence $m$ combinations of signals, where $m$ is an integer equal to or greater than the number of incoming lines;

decoding means responsive to said counter means for producing one-out-of-$m$ signals;

gating means responsive to said decoding means and to the ringing signal on said one of said plurality of incoming lines for producing an equipment locator signal to a switching matrix; and terminator means responsive to an equipment locator signal from said gating means for disabling said counter means.

2. A system for switching one of a plurality of incoming telephone lines to one of a plurality of telephone stations, each of said telephone stations including dial signal producing means, comprising the combination of:

annunciator means responsive to a ringing signal for indicating an active incoming telephone line;

register means responsive to dial signals from one of said plurality of telephone stations for producing an output signal indicative of an answering mode;

polling means responsive to the output signal from said register means for sequentially polling said incoming telephone lines; and means responsive to the ringing signal on said active incoming telephone line when polled for directly coupling said active incoming telephone line to said one of said plurality of telephone stations.

3. The invention as claimed in claim 2 wherein said polling means includes counter means responsive to a signal indicating that an incoming line circuit is coupled to a terminal corresponding to the counter value;

means responsive to output signals from said counter means for producing a signal indicative of a particular group of incoming lines; and gating means for inhibiting said group indicator signal in response to an end-of-group signal.

4. The invention as claimed in claim 3 wherein said polling means further includes means responsive to said gating means for generating a telephone number and means for storing said generated telephone number.

* * * * *